United States Patent [19]

Barker et al.

[11] 3,952,826

[45] Apr. 27, 1976

[54] ARTICULATED VEHICLE

[75] Inventors: Dean Marshall Barker, Rockford; Mark Harold Sickman, Hopkins, both of Minn.

[73] Assignee: White Farm Equipment Company, Cleveland, Ohio

[22] Filed: Apr. 4, 1974

[21] Appl. No.: 457,997

[52] U.S. Cl. .............................. 180/136; 280/468
[51] Int. Cl.² .......................................... B62D 5/10
[58] Field of Search ............... 180/51, 52, 79.2 B; 280/467, 468

[56] References Cited
UNITED STATES PATENTS

| | | | |
|---|---|---|---|
| 3,168,332 | 2/1965 | Eynon | 280/468 |
| 3,390,735 | 7/1968 | Medley | 180/79.2 B |
| 3,424,475 | 1/1969 | Gibson | 180/52 |
| 3,439,768 | 4/1969 | Medley | 180/79.2 B |
| 3,603,424 | 9/1971 | Blood | 180/79.2 B |
| 3,773,129 | 11/1973 | Anderson | 180/79.2 B |
| 3,815,938 | 6/1974 | Molby | 180/51 |

Primary Examiner—Philip Goodman
Assistant Examiner—John A. Carroll
Attorney, Agent, or Firm—Watts, Hoffmann, Fisher & Heinke Co.

[57] ABSTRACT

An articulated vehicle is disclosed which includes first and second vehicle sections interconnected by an articulating linkage. The articulating linkage includes a universal joint and a cooperating pantograph linkage. The universal joint and the pantograph linkage define a vertically extending steering axis about which the vehicle sections are relatively pivoted to enable steering. The pantograph linkage comprises a first link bar pivoted to one vehicle section in substantial alignment with the steering axis and second and third link bars connected between respective end portions of the first link bar and connecting locations on the other vehicle section. A steering actuator is connected between the first link bar and the associated vehicle section and is operated to provide forces for steering the vehicle.

The pantograph linkage and universal joint cooperate to enable relative vehicle section oscillations without significant changes in the vehicle steering geometry while isolating the steering actuator from direct application of large magnitude forces which might otherwise be applied to it by relative oscillations of the vehicle sections.

13 Claims, 3 Drawing Figures

ARTICULATED VEHICLE

BACKGROUND OF THE INVENTION

1. Field of the Invention

The present invention relates to articulated vehicles and more particularly relates to steerable articulated automotive vehicles which are frequently operated off the highway over rugged terrain.

2. The Prior Art

Various constructions of steerable articulated automotive vehicles have been proposed by the prior art, many of which have been employed with farming tractors or similar vehicles which must be operable over rugged terrain.

When an articulated vehicle is intended for use off of the highway, its construction must be such that the ground engaging wheels, or treads, supporting one vehicle section can move vertically relative to the remaining vehicle wheels or treads in such a way that traction is maintained when the vehicle moves along rough ground. Various constructions have been proposed to provide this feature.

According to some proposals, a two section vehicle frame was provided with an articulating joint between the frame sections which permitted the frame sections to be provided relatively about a vertical steering axis. Wheel axles supporting one or both frame sections were oscillatable relative to the longitudinal mid-line of the associated frame section when uneven surfaces were encountered. These proposals generally necessitated large, heavy and complex frames and suspensions.

Another type of proposal employed a frame section articulating linkage which permitted articulation of the frame sections both about a vertical steering axis and a longitudinal axis. These articulating linkages were generally complex gimble-like constructions and when employed in heavy duty vehicles they had to be of great strength. In some proposals the steering forces were applied to parts of the gimbal structure which necessitated a construction capable of transmitting extremely large steering torques.

A more recent approach provided a frame section articulating linkage which included a universal spherical bearing assembly between the frame sections and a single floating link separately connected between the frame sections to limit the action of the spherical bearing assembly. One or more hydraulic steering rams were connected between the frame sections to provide for steering the vehicle by pivoting the frame sections about the steering axis.

In vehicles where a single ram was employed on one side of the longitudinal midline of the vehicle, the oscillation of one frame section relative to the other when the vehicle was being driven in a desired direction caused the steering angle between the frame sections to change, i.e., the steering geometry of the vehicle was altered, and the vehicle changed direction. This was due to the fact that when one frame section oscillated unrestrained (i.e., in the absence of a steering ram) relative to the other frame section, no two points of the respective frame sections on the same side of the vehicle mid-line remained the same distance apart. However when any such points were connected by a steering ram, the distance between the points could not change when the ram was not extended or retracted and as a consequence the vehicle was turned when relative frame oscillations occurred.

Where two steering rams were connected between the frame sections, one on each side of the vehicle mid-line, and the frame sections oscillated relative to each other, the rams, their associated hydraulic systems, and the connections between the rams and the respective frame sections, were frequently subjected to large magnitude compressive or tensile forces which tended to damage the components of the steering system and/or cause the introduction of air or vapor bubbles into the hydraulic fluid. Where large magnitude forces were attempted to be controlled by the use of hydraulic fluid pressure relief valves, the operation of the relief valves tended to cause abrupt turning of the vehicle while the steering wheel remained stationary.

SUMMARY OF THE INVENTION

The present invention provides a new and improved articulated vehicle having articulated vehicle frame sections which are strong yet relatively light, and of simple construction. The frame sections are interconnected by a new and improved articulating linkage which enables relative frame section oscillations when the vehicle moves in a given direction across rough ground without loss of traction or significant changes in the steering geometry, or steering angle, of the vehicle. Furthermore, the new articulating linkage isolates the steering actuator, or actuators, from large magnitude forces which might otherwise be applied to them as a result of frame section oscillations.

In an illustrated and preferred embodiment of the present invention a self-propelled vehicle in the form of a farming tractor is constructed of forward and rear vehicle sections which are interconnected by the articulating linkage. Each vehicle section has a main frame which is substantially rigidly supported by ground engaging wheels. The articulating linkage enables steering the vehicle by providing for articulation of the main frames about a vertical steering axis while also permitting the frames to oscillate relative to each other about a "roll" axis extending longitudinally of the tractor as it transverses rough terrain. An important feature of the articulating linkage resides in its ability to accommodate terrain created frame oscillations while maintaining the vehicle steering geometry, i.e., the angle between the longitudinal mid-lines of the vehicle sections, substantially unchanged as the vehicle is driven in a given direction along the terrain.

The articulating linkage comprises a universal joint, or bearing unit, and a pantograph linkage which separately interconnect adjacent ends of the foreard and rear main frames. The universal joint is preferably formed by a spherical bearing connected between the vehicle sections on the longitudinal mid-lines of the vehicle sections. The center of the bearing unit lies on a vertical steering axis of the vehicle and the bearing unit construction is such that the frame sections can oscillate relative to each other universally about the center of the bearing unit, to the extent permitted by the pantograph linkage.

The pantograph linkage cooperates with the universal joint to permit substantially unrestricted steering articulation of the vehicle sections while constraining the vehicle sections against relative pitching oscillations and limiting the extent of "rolling" oscillations. The pantograph linkage is spaced vertically from the universal joint and comprises a first link bar which is supported between its ends on one main frame section for pivotal movement about the vehicle steering axis. Opposite end portions of the first link bar are universally connected to respective second and third link bars which extend parallel to each other from the first link bar to respective universal bearing connections on the other main frame section. The universal bearing connections on the other main frame section are disposed on a line extending transversely of the associated main frame section so that the fourth bar of the pantograph linkage is formed, in effect, by the other main frame section.

The second and third link bars maintain a substantially constant angular relationship (preferably parallel) between the first and fourth bars of the pantograph linkage. Because of the universal connections at their ends, the second and third link bars can transmit forces only in the direction of their extents and thus cannot transmit torsional forces, or moments, between the first and fourth link bars.

Steering forces are transmitted between the vehicle sections from a steering actuator associated with the pantograph linkage. The first link bar is pivotally moved about the steering axis relative to its supporting main frame by a steering actuator which reacts between the first link bar and its supporting main frame. When the first link bar is pivoted, the second and third link bars cooperate to shift the bearing connections on the other main frame section in accordance with the angular movement of the first link bar so that the frame sections pivot relatively about the steering axis to change the angle between the vehicle section mid-lines and turn the vehicle.

The pantograph linkage and universal joint cooperate, when the vehicle is proceeding in a given direction, to permit relative "rolling" oscillations of the main frames while maintaining the vehicle steering geometry, or steering angle, substantially unchanged. When a wheel on one frame section encounters a bump or a rut, that wheel is shifted vertically relative to the other vehicle wheels resulting in oscillation of the associated main frame relative to the other main frame.

The vehicle sections are constrained to "roll" with respect to each other about a center in the universal joint so that when the vehicle is proceeding in a given direction and relative rolling oscillation between the vehicle sections occurs, the first and fourth bars of the pantograph linkage must move relative to each other about an axis of rotation through the universal joint and parallel to the vehicle section mid-lines. This skews the first and fourth bars of the linkage with respect to each other but the distances between the respective ends of these bars remain equal. The second and third link bars thus do not force a change in the steering geometry, or steering angle, and the vehicle section mid-lines remain aligned in a vertical plane.

The cooperation between the pantograph linkage and the universal joint maximizes the operator's ability to control the direction of movement of the vehicle as it proceeds in a given direction over rough terrain, for example through row crops. When the vehicle is turning and relative rolling oscillations of the vehicle sections occur; the steering angle of the vehicle may be changed somewhat but this does not prevent a serious control problem for the operator.

The first link bar is preferably provided with an abutment member which engages spaced abutment locations on the other main frame to positively limit the extent of rolling oscillation of one frame member with respect to the other. The abutment member cannot engage either abutment location during turning of the vehicle so that the abutments do not limit the extent of steering articulation of the frames.

The pantograph linkage constrains the frame sections against substantial pitching oscillations or movement relative to each other which would otherwise tend to result from vertical movement of the universal joint. Relative pitching motion of the frame sections occurs only to the extent that the second and third link bars are foreshortened when rolling oscillations occur. The relative pitching motion which does occur tends to reduce stresses in the second and third link bars.

Forces tending to make the vehicle sections pitch relative to each other are created by torque reactions between the driving wheels and the ground, out of balance conditions of the vehicle sections creating a tendency for the sections to tip about their respective axles, and pitching forces created by rough terrain.

The pitching forces are borne by the second and third link bars which normally tend to both apply either compressive or tensile forces between the first and fourth bars of the linkage when the vehicle sections tend to pitch. The forces applied to the first link bar are borne by the first link bar pivot and accordingly, the steering actuator tends to be isolated from large magnitude pitching forces which could otherwise be applied to it.

The steering axis location along the first link bar pivot axis enables the vehicle steering forces to be applied efficiently about the steering axis and without unduly stressing components of the articulating linkage itself.

A principal object of the present invention is the provision of a new and improved articulated vehicle having an articulating linkage which functions to effectively steer the vehicle while enabling relative vehicle frame oscillations due to rough terrain to occur while the vehicle is proceeding in a given direction without significant steering geometry changes, and which also minimizes forces applied to a steering actuator of the vehicle as a result of relative frame oscillations.

Other objects and advantages of the invention will become apparent from the following detailed description of a preferred embodiment made with reference to the accompanying drawings which form part of the specification.

DESCRIPTION OF A PREFERRED EMBODIMENT

Figure 1:
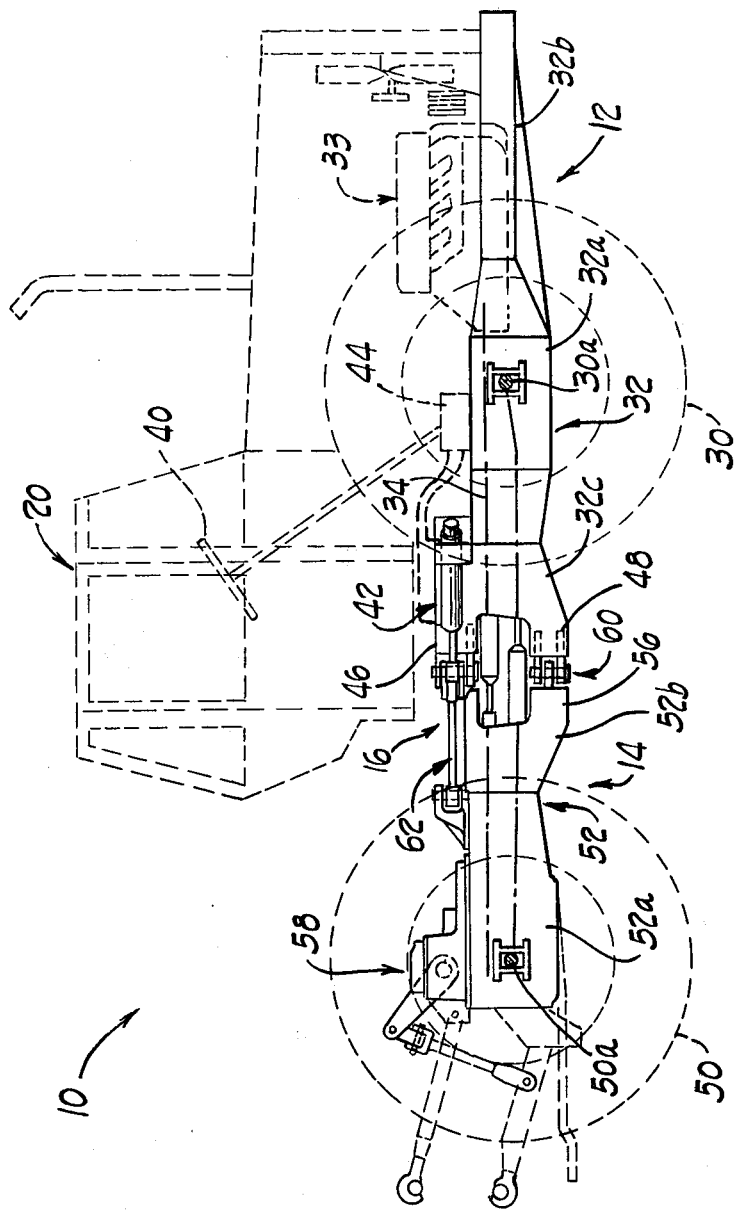
FIG. 1 is a side elevational view of an articulated vehicle embodying the present invention with portions shown schematically.

An articulated four wheel drive automotive vehicle 10 embodying the present invention is illustrated in FIG. 1 of the drawings. The vehicle 10, which is illustrated as a farming tractor, comprises a forward vehicle section 12, a rear vehicle section 14, and an articulating linkage 16 interconnecting the forward and rear vehicle sections. The articulating linkage 16 is constructed and arranged to enable articulation of the vehicle sections for steering the vehicle while accommodating relative oscillation of the vehicle sections due to rough terrain over which the vehicle passes in a given direction without substantially altering the steering geometry of the vehicle, which would otherwise cause the vehicle to change direction.

The forward vehicle section 12 includes ground engaging wheels 30 each associated with the driving axle 30a. A main vehicle frame 32 is rigidly supported on the axles. In the preferred and illustrated embodiment of the invention, the main frame 32 is defined by a cast housing body 32a, a forwardly projecting frame structure 32b, and a rearwardly projecting frame structure 32c. The body 32a and frame structures 32b, 32c are rigidly connected together to form an integral frame unit.

A prime mover 33, preferably an internal combustion engine, is supported on the frame structure 32b. A change gear power transmission, schematically illustrated at 34, is supported by the housing body 32a and is constructed to transmit drive from the prime mover to the axles 30a which are journaled in the housing body 32a. The transmission includes a propeller shaft and a separate power take off (PTO) shaft which extend to the rear vehicle section 14 from the housing body 32a.

An operator's cab 20 is supported on the rearwardly projecting frame structure 32c and is provided with suitable controls for governing operation of the tractor including a steering wheel (indicated at 40) and throttle and transmission controls which are not illustrated. The frame 32c also supports a hydraulic steering actuator 42 which is connected to the steering wheel 40 via a suitable or conventional hydraulic system which is schematically illustrated at 44. The hydraulic system 44 includes a pump operated by the engine 18 to supply hydraulic fluid to the actuator 42 via valving which is operated in accordance with manual movement of the steering wheel 40.

The rearwardly projecting frame structure 32c terminates in projections 46, 48 which are vertically spaced apart and to which the articulating linkage 16 is connected.

The rear vehicle section 14 comprises ground engaging wheels 50, each associated with a respective driving axle 50a and a rear main frame 52 which is supported on the axles. The rear main frame 52 comprises a cast housing body 52a which houses components of the power transmission 34 and to which the axles 50a are journaled. A forwardly projecting frame section 52b is rigidly connected to the housing 52a.

The frame section 52b includes a frame portion 56 which projects toward the forward main frame projection 48 for connection to the articulating linkage 16. The frame housing 52a supports a suitably constructed hitch mechanism 58 to which plows or other implements are connected for drafting. The hitch mechanism 58 is actuated from the prime mover via the PTO shaft through a hydraulic actuator supported by the housing 52a. The hitch mechanism may be conventional and is therefore not illustrated in detail or described further.

The articulating linkage 16 comprises a universal joint, or bearing unit, 60 which is connected between the respective frame projections 48, 56 and a pantograph linkage 62 which extends between the frame projection 46 and the rear main frame housing 52a. The universal joint 60 and pantograph linkage 62 cooperate to interconnect the front and rear main frames for steering articulation of the vehicle sections while permitting limited relative rolling oscillation between the vehicle sections as the vehicle traverses rugged terrain in a given direction without changing the steering angle between the vehicle sections or transmitting unduly large forces to the steering actuator 42. The linkage 16 substantially prevents relative pitching oscillations of the main frames.

Figure 2:
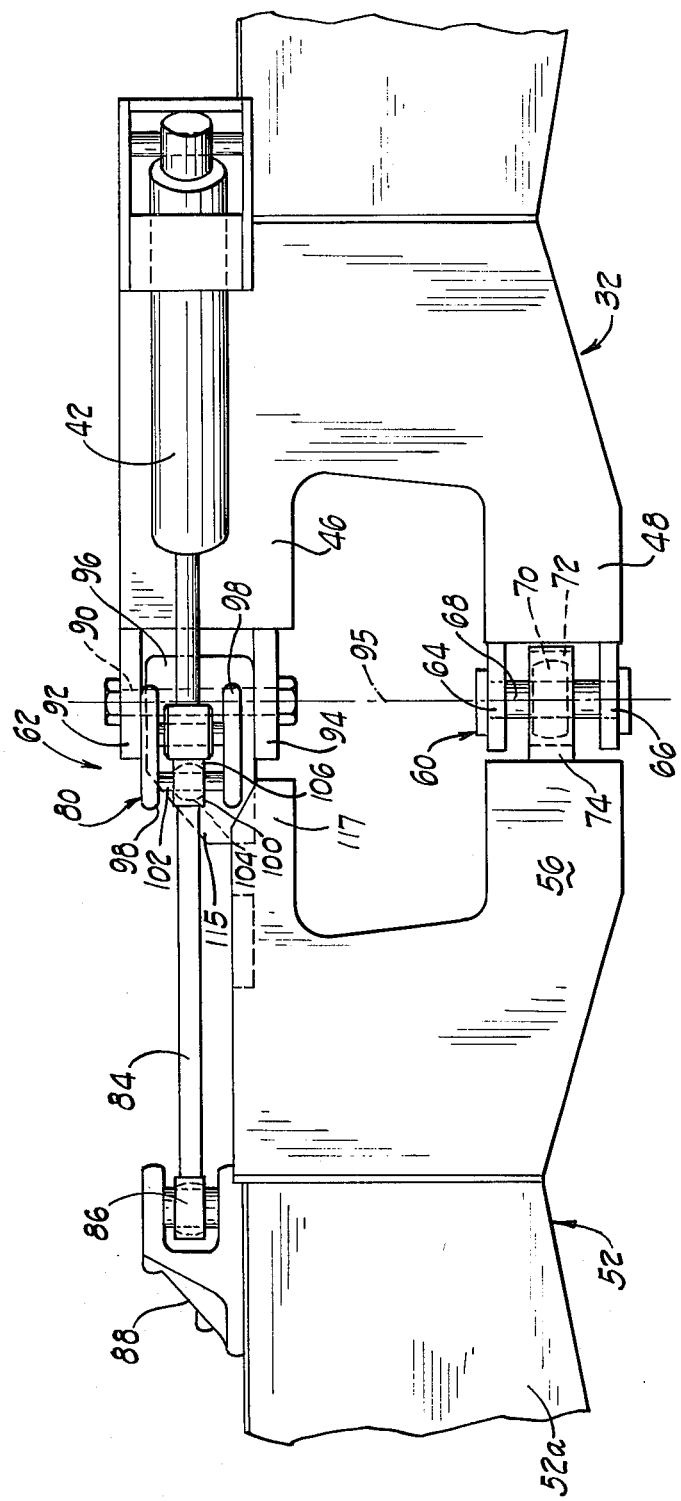
FIG. 2 is a side elevational view of an articulating linkage forming part of the vehicle of FIG. 1.

Referring now to FIG. 2, the universal joint 60 is preferably formed by a spherical bearing unit which comprises vertically spaced parallel horizontal support plates 64, 66 which extend rearwardly from the frame projection 48 towards the rear frame projection 56. A pin 68 is disposed in a generally vertical orientation between the plates 64, 66 with its ends connected to the plates by suitable fasteners. An annular bearing member 70 is secured about the pin 68 between the plates 64, 66. The bearing member defines an external semispherical bearing surface. A semispherical annular cup 72 is disposed about the bearing member 70 and is fixed to the rear main frame 52 in a plate 74 which is connected to the frame projection 56 and surrounds the bearing cup 72. The bearing member 70 and the cup 72 form what is often referred to as a "rod end" type bearing and since this type of bearing is well known the bearing is not shown in detail in the drawings.

The universal joint 60 permits the frames 32, 52 to oscillate relative to each other universally about the center of curvature of the surface of the bearing member 70 without transmitting twisting moments between the vehicle frame sections. The relative frame oscillations can occur first about an axis extending through the center of the bearing member longitudinally of the tractor, i.e. the frame sections can "roll" relative to each other about the longitudinal axis; second, about a horizontal axis extending transverse to the longitudinal axis through the bearing member center, i.e., the frame sections can "pitch" relative to each other; and third, the relative oscillations can occur about a vertical axis through the bearing member, i.e., the frame sections can "yaw" relative to each other. The last mode of relative frame oscillation which is referred to as "articulation" results in the steering of the vehicle.

The universal joint 60, to the extent not constrained by the pantograph linkage, could permit any or all modes of relative oscillation to occur at any given moment. These relative oscillations are permitted to occur to the extent the operation of the universal joint is not restricted by the pantograph linkage 62 which in fact permits limited "rolling," and all but prevents the frame sections from "pitching" oscillation relative to each other about the center of the spherical bearing member, as noted previously.

The pantograph linkage 62 functions in cooperation with the steering actuator 42 to establish desired steering angles or geometry between the front and rear vehicle sections 12, 14, respectively, and to substantially maintain the established steering geometry between the frame sections unchanged as the vehicle traverses rough terrain in a given direction while enabling limited relative rolling oscillating motion of the vehicle sections to accommodate the terrain. The pantograph linkage 62 comprises a first link bar 80 which is pivoted between its ends to the forward main frame 32, second and third parallel link bars 82, 84, respectively, which are universally connected to respective opposite end portions of the bar 80 and extend to respective universal bearing connections 85, 86 on the rear main frame 52. In the preferred embodiment the bearing connections 85, 86 are supported on a bracket 88 which is rigidly fixed on the respective housing body 52a. The fourth bar of the pantograph linkage is formed by the bracket 88 and thus, in effect, by the rear main frame itself.

The location of the bracket 88 on the forward end of the rear frame body 52a enables the application of articulating forces from the pantograph linkage directly to the rear frame rather than via the universal joint supporting structure while at the same time minimizing the length of the link bars 82, 84.

In the preferred and illustrated embodiment of the invention the link bar 80 is journaled on a vertical pin 90 which is anchored between parallel rearwardly extending frame plates 92, 94. The pin enables the transmission of vehicle steering moments between the vehicle sections and supports the link bar 80 against longitudinally directed forces applied to the bar 80 by the bars 82, 84 as a result of torque reactions between the driving wheels and the ground, tendencies of the vehicle sections to tip about their axles and as a result of the vehicle traversing rough terrain. The pivot axis provided by the pin 90 is coaxial with the axis of the universal joint pin 68 and accordingly the pins 90, 68 define a generally vertical axis 95 about which the vehicle sections are articulated relative to each other to steer the vehicle.

The link bar 80 is formed by a central body portion 96 which surrounds the pin 90 and horizontally extending bifurcated end portions 97, 98 which extend oppositely from the body portion 96. The link bars 82, 84, respectively, are connected to the link bar 80 by universal rod end type bearings 100 which are disposed between the branches of the respective bifurcated link bar end portions 97, 98. Each bearing 100 comprises a pin 102 which extends vertically between the horizontal branches of the respective bifurcated link bar end portion, a semi-spherically curved annular bearing element 104 which is disposed about the pin 102 and a conforming bearing cup 106 which mates with the surface of the bearing element. The cup 106 is carried by the respective link bar 82, or 84. The bars 82, 84 are capable of transmitting compressive or tensile forces to the link bar 80 but, because of the universal bearings 100, moments, or torsional forces, cannot be transmitted between the link bars 80, 82 and 84. The bearing connections 86, 88 between the link bars 82, 84 and the bracket 88 are of the same construction as the bearings 100 and accordingly these bearing connections permit transmission of forces along the direction of extent of the link bars 82, 84 but do not permit the transmission of moments or torque between the link bars and the rear frame.

The link bar 80 is connected to the bars 82, 84 along a line 110 which extends transversely of the tractor 10. The bars 82, 84 are connected to the bracket 88 along a line 112 which extends transversely of the tractor. The lines 110, 112 remain parallel to each other as the vehicle traverses smooth horizontal ground, or roadways (see FIG. 3). Thus when the bar 80 is pivoted about the steering axis 95, the vehicle sections pivot relative to each other about the axis 95 to alter the direction of travel of the vehicle since the angular relationship between the bar 80 and the bracket 88 remains constant (i.e., the lines 110, 112 remain parallel).

The steering forces are transmitted from the steering actuator to the vehicle sections by the pantograph linkage. When the vehicle is being turned towards the left, the bars 82, 84 are in tension and compression, respectively, and when the vehicle is turned towards the right the bars 82, 84 are in compression and tension, respectively.

The steering actuator 42 is connected between the end portion 98 of the link bar 80 and the front main frame 32 so that when the steering actuator 42 is operated, the link bar 80 is rotated about the steering axis 95. This results in the link bars 82, 84 turning the rear main frame 52 about the axis 95 relative to the forward main frame thus maintaining the angular relationship between the link bar 80 and the bracket 88 substantially unchanged. As a consequence the vehicle main frames 32, 52 are articulated relative to each other and the vehicle is turned in accordance with the extent of pivotal movement of the link bar 80.

The actuator 42 is preferably a hydraulic double acting piston-cylinder type ram which includes a cylinder 120 journaled at its forward end to the main frame 32 and a piston element having a piston rod 122 which is journaled to the link bar 80 via a bearing connection 124. The actuator is operated in relation to turning of the steering wheel by suitable valves associated with the hydraulic system 44.

In the preferred embodiment of the invention the piston rod 122 is journaled to a projecting part 126 of the link bar end portion 98 radially outwardly from the bearing 100. Accordingly the actuator acts to turn the link bar 80 through a lever arm which is greater than the lever arm through which turning of the link bar 80 is resisted by the link bars 82, 84, and the force required for the actuator to turn the link bar is less than the total force exerted by the link bars 82, 84 between the bracket 88 and the link bar 80 for articulating the frame sections.

When the tractor moves in a given direction over rough terrain the universal joint 60 and the pantograph linkage 62 cooperate to permit limited relative rolling oscillation of the vehicle sections. For instance, if one rear wheel of the tractor moves into a rut or depression in the ground while the other three wheels of the tractor remain on substantially planar ground the rear vehicle section will tend to oscillate relative to the forward vehicle section by rolling slightly about a longitudinally extending axis. This rolling tends to lower the universal joint 60 and lower and skew the line 112 relative to the line 110.

The bars 82, 84 prevent the universal joint from changing elevations in such a way as to create any substantial pitching of the vehicle sections and since rolling oscillation of one vehicle section relative to the other must occur about the center of the universal joint 60 along an axis parallel to the mid-lines of the vehicle sections, the skewing of the line 112 relative to the line 110 does not result in a tendency for the link bars 82, 84 to be unequally tensioned or compressed. Accordingly relative rolling oscillation is not accompanied by steering forces produced by the link bars 82, 84 which would otherwise change the steering angle between the vehicle sections.

The pantograph linkage and the universal joint cooperate so that rolling oscillation of one vehicle section relative to the other vehicle section, while the vehicle is being turned, may result in a change in steering angle, but to the extent the steering angle is changed during a turn, there is no pronounced adverse effect on the ability of the operator to control the vehicle.

Figure 3:
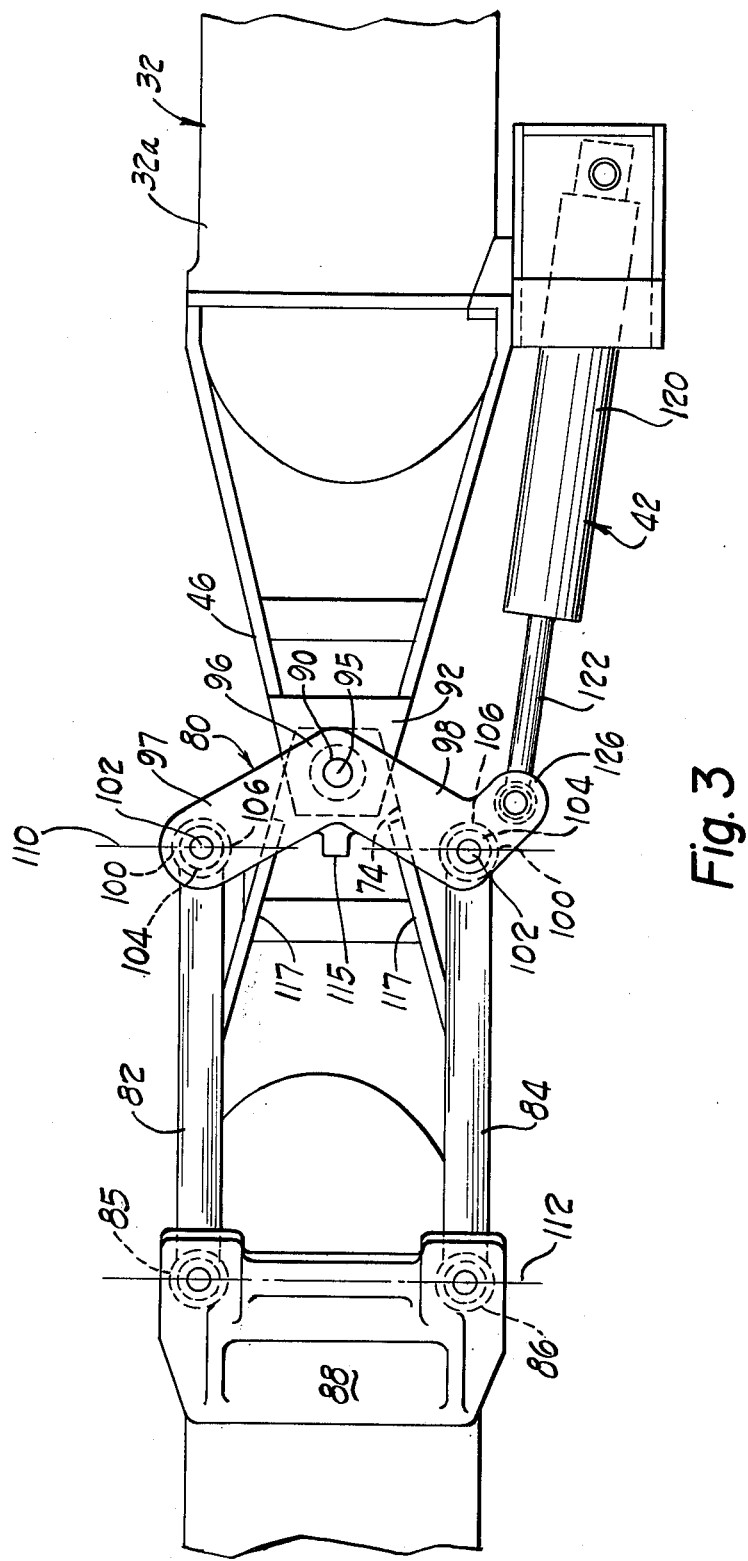
FIG. 3 is a top plan view of the articulating linkage of FIG. 2.

In the preferred embodiment of the invention the pantograph linkage is constructed to positively limit the extent of relative rolling oscillation between the frame sections. Referring to FIGS. 2 and 3, the link bar body portion 96 includes a projection 115 extending rearwardly away from the axis 95. The projection 115 extends between laterally spaced forwardly extending projections 117 of the rear vehicle frame section 52b. When the main frame sections undergo rolling oscillation relative to each other through a predetermined angular displacement about the center of the universal bearing unit 60, the projection 115 engages one or the other of the frame projections 117 to positively limit any greater relative rolling movement of the main frames. The projections 115 and 117 are spaced apart a predetermined distance to enable a predetermined desirable total maximum angular displacement between the main frame sections (e.g., 30°). When the vehicle is turning the projection 115 remains centered between the projections 117 and the steering radius is thus unaffected.

The front and rear main frames are preferably constructed so that their respective centers of gravity are disposed substantially in vertical planes extending through the respective frame axles. Hence when the vehicle is on a generally planar surface, such as a roadway, the frame sections are each substantially balanced and the link bars 82, 84 are not subjected to any substantial compression or tensile forces created by a tendency of the vehicle sections to pitch relative to each other. The torque reactions between the driving wheels and the ground produce relatively large and consistent forces in the link bars 82, 84. In most circumstances when rugged terrain is encountered the tendency of the frame sections to pitch relative to each other causes both the link bars 82, 84 to be subjected to either compressive or tensile stresses in resisting pitching of the vehicle sections. Since the link bar 80 is pivoted between the connections with the link bars 82, 84, the moments applied to the link bar 80 by the link bars 82, 84 tend to be balanced and the net force applied to the link bar 80 tends to be borne by the pivot pin 90. This effectively isolates the actuator 42 from the longitudinal forces.

To the extent the compressive or tensile loadings of the link bars 82, 84 differ from each other, the differential moment produced by the forces is balanced by the steering actuator 42. Under normal conditions the differential forces involved are relatively small. Hence the actuator 42 is not required to balance extremely large moments applied to the bar 80 as a result of rough terrain. Connection of the steering actuator piston rod radially farther away from the axis 95 than the bearing connections 100 provides a mechanical advantage for the actuator in that the magnitude of the force exerted by the actuator in balancing a given moment exerted on the link bar 80 via the bars 82, 84 is less than the magnitude of the differential forces creating the moment.

While a single preferred embodiment of the invention has been illustrated and described, the invention is not to be considered limited to the precise construction disclosed. Various adaptations, modifications and uses of the present invention may occur to those skilled in the art to which it relates and the intention is to cover all such adaptations, modifications and uses of the invention which come within the spirit or scope of the appended claims.

What is claimed is:

1. In an articulated vehicle comprising:
   a. a first vehicle section comprising a first frame supported by ground engaging members;
   b. a second vehicle section comprising a second frame supported by ground engaging members; and,
   c. articulating means for interconnecting said first and second vehicle sections and comprising:
      i. universal joint means connected between said first and second frames defining a vertically extending steering axis about which said first and second vehicle sections are relatively pivoted to enable steering of the vehicle;
      ii. pantograph linkage means interconnecting said vehicle sections and comprising a first link structure pivoted to one of said vehicle sections in substantial alignment with said vertical axis and having portions which extend laterally oppositely away from said axis, second and third links connected to respective lateral portions of said first link structure and extending to connecting locations on the other of said vehicle sections, said connecting locations and said other vehicle section defining a fourth link structure of said pantograph linkage means; and,
      iii. steering actuator means connected to said one vehicle section and cooperating with said pantograph linkage means to provide for articulation of said vehicle sections about said steering axis.

2. The vehicle claimed in claim 1 wherein said second and third links are connected to said first link structure and to said respective connecting locations by universal connectors whereby oscillations of said vehicle sections relative to each other are enabled by said pantograph linkage means.

3. The vehicle claimed in claim 2 wherein said universal joint means comprises a spherical bearing unit which enables relative oscillating movement of said vehicle sections about axes extending through a center of said bearing unit.

4. The vehicle claimed in claim 1 wherein said universal joint means is vertically spaced from said first link structure.

5. A vehicle claimed in claim 1 wherein said steering actuator means comprises a hydraulic ram connected between the frame of said one vehicle section and a projecting portion of said first link structure.

6. The vehicle claimed in claim 5 further comprising a pivot pin member connecting said first link structure to said one vehicle section, said pivot pin extending along said steering axis and said ram connected to said first link structure radially beyond the connections of said first link structure to said second and third links.

7. The vehicle claimed in claim 1 further including structure for positively limiting the extent of relative rolling oscillation between said first and second vehicle sections, said structure comprising an abutment member fixed with respect to said first link structure and second and third spaced abutment members supported on said other vehicle section and respectively engageable with said first abutment member to define limits of relative rolling oscillation between said vehicle sections.

8. An articulated vehicle comprising:
   a. a first vehicle section;
   b. a second vehicle section;
   c. articulating means interconnecting said vehicle sections, said articulating means comprising:

i. universal joint means connecting said vehicle sections; and, ii. linkage means connecting said vehicle sections;

iii. said linkage means comprising a first link member supported on said first vehicle section for pivotal movement about an axis extending through said universal joint means and second and third link members connected to said first link member at respective locations on opposite lateral sides of said axis and to said second vehicle section; and, d. steering actuator means connected to one of said vehicle sections and to said linkage means for relatively oscillating said vehicle sections about said axis to effect steering of said vehicle.

9. The vehicle claimed in claim 8 wherein said steering actuator is connected to said first vehicle section and to said first link member, said actuator means operative to pivot said first link member relative to said first vehicle section.

10. The vehicle claimed in claim 9 wherein said second and third link members extend parallel to each other between said first link member and respective connecting locations on said second vehicle section, when the vehicle is on a level surface, said connecting locations disposed on a line extending parallel to said first link member.

11. The vehicle claimed in claim 9 further including universal bearing connections between each of said second and third link members and said first link member and said second vehicle section, said universal bearing connections preventing transmission of moments by said second and third link members.

12. The vehicle claimed in claim 8 wherein said steering actuator comprises a fluid operated ram and further comprising a fluid system for operating said ram in response to actuation of a vehicle steering control member.

13. The vehicle claimed in claim 8 wherein said first link member includes an abutment member projecting towards said second vehicle section, said second vehicle section supporting second and third abutment members disposed on opposite lateral sides of said first abutment member, said second and third abutment members respectively engaging said first abutment member to define limits of relative rolling oscillation between said vehicle sections.

* * * * *

UNITED STATES PATENT AND TRADEMARK OFFICE
CERTIFICATE OF CORRECTION

PATENT NO. : 3,952,826
DATED : April 27, 1976
INVENTOR(S) : Dean Marshall Barker and Mark Harold Sickman It is certified that error appears in the above-identified patent and that said Letters Patent are hereby corrected as shown below:

Column 7, line 16, after "pin" insert -- 90 --;

Column 11, line 21 (Claim 10), "9" should be -- 8 --.

Signed and Sealed this

Seventh Day of December 1976

[SEAL]

Attest:

RUTH C. MASON
Attesting Officer

C. MARSHALL DANN
Commissioner of Patents and Trademarks